(12) United States Patent
Grigis

(10) Patent No.: US 8,038,184 B2
(45) Date of Patent: Oct. 18, 2011

(54) DYNAMICALLY SELF-LOCKING CATCHING DEVICE

(75) Inventor: Francois Grigis, Tournefeuille (FR)

(73) Assignee: Aircelle (FR)

( * ) Notice: Subject to any disclaimer, the term of this patent is extended or adjusted under 35 U.S.C. 154(b) by 669 days.

(21) Appl. No.: 12/067,160

(22) PCT Filed: Aug. 17, 2006

(86) PCT No.: PCT/FR2006/001954
§ 371 (c)(1),
(2), (4) Date: Mar. 17, 2008

(87) PCT Pub. No.: WO2007/031616
PCT Pub. Date: Mar. 22, 2007

(65) Prior Publication Data
US 2008/0197641 A1 Aug. 21, 2008

(30) Foreign Application Priority Data
Sep. 15, 2005 (FR) .................................. 05 09412

(51) Int. Cl.
*E05C 19/06* (2006.01)
*E05C 19/00* (2006.01)

(52) U.S. Cl. .............. 292/80; 292/81; 292/87; 292/332; 292/DIG. 4; 292/DIG. 15

(58) Field of Classification Search .................... 292/80, 292/81, 83, 87, 332, DIG. 4, DIG. 15
See application file for complete search history.

(56) References Cited

U.S. PATENT DOCUMENTS

| 230,422 | A | * | 7/1880 | Kelley | 292/128 |
|---|---|---|---|---|---|
| 905,804 | A | * | 12/1908 | Fies | 292/78 |
| 1,338,052 | A | * | 4/1920 | Voight | 292/130 |
| 1,724,438 | A | * | 8/1929 | Vance | 292/198 |
| 2,294,683 | A | * | 9/1942 | Murphy | 292/99 |
| 4,655,489 | A | * | 4/1987 | Bisbing | 292/110 |
| 6,045,091 | A | | 4/2000 | Bandu et al. | |
| 7,578,531 | B1 | * | 8/2009 | Leontaridis | 292/11 |

OTHER PUBLICATIONS

The International Search Report PCT/FR2006/001954 dated Jan. 29, 2007.

* cited by examiner

*Primary Examiner* — Carlos Lugo
(74) *Attorney, Agent, or Firm* — Cantor Colburn LLP

(57) ABSTRACT

The invention concerns a catching device (1) between a first structure (2) and a second structure (3), characterized in that it comprises at least one bolt (5) linked to the first structure and mounted in opposition to at least one elastic return (9) tending to bring it back to a retracted position, a stop (10) corresponding to the second structure being adapted to maintain it in a taut state when the latter is proximate the first structure, such that when the first structure is rapidly spaced apart from the second structure, each bolt is engaged with at least one corresponding retainer (4) so as to limit the relative spacing and, when the first structure is slowly spaced apart from the second structure, each bolt and corresponding retainer remain separated, thereby allowing complete opening between the first structure and the second structure.

9 Claims, 2 Drawing Sheets

DYNAMICALLY SELF-LOCKING CATCHING DEVICE

The present invention relates to a catching device between a first structure and a second structure of an aircraft nacelle which can move with respect to each other, and also relates to a structure equipped with a device of this type.

An aircraft nacelle is intended to surround a turbojet engine and is generally equipped with a thrust reverser intended to improve the braking thrust of the aircraft by diverting in a forward direction part of the gas flow emitted by the turbojet engine.

A thrust reverser generally has two half-structures which surround a rear part of the turbojet engine and which can be opened in order to allow access to the inside of the nacelle and to the part of the turbojet engine surrounded by the thrust reverser. Clearly, these half-structures must only be openable in strictly specified circumstances, for example in the course of maintenance operations.

Each half-structure is made openable by the presence of hinges mounted in the upper part of the nacelle, in what is called the twelve o'clock position, and kept closed by a plurality of locks mounted in the lower part, in what is called the six o'clock position. For safety reasons, these locks are supported by a supplementary locking system intended to provide protection in certain cases of severe loading of the nacelle, such as a sudden internal excess pressure during the operation of the turbojet engine. This supplementary locking system is fixed to the upper part of the nacelle in order to prevent an excessively large movement of the half-structures with respect to each other.

Clearly, such considerations are also applicable to nacelles which are not equipped with reversers and which have covers which enable the inside of the nacelle to be accessed in the same way.

It is therefore useful to provide easily accessible actuating systems for these locks, such as accessible systems of handles and cables at the six o'clock position, connected to the supplementary locking system at the twelve o'clock position.

In such a fastening system, therefore, it is necessary to actuate all the locks which lock the two half-structures on the nacelle for each maintenance operation, using a complicated procedure which requires a fine adjustment between the locks located at the six o'clock position and the locks located at the twelve o'clock position.

The object of the present invention is to overcome the aforementioned drawbacks, and for this purpose it provides a catching device, between a first structure and a second structure which can move with respect to each other, comprising at least one bolt which is linked to the first structure and which is adapted to be engaged, when appropriate, with at least one corresponding retaining means of the second structure, characterized in that each bolt is mounted in opposition to at least one elastic return means tending to bring it back to a retracted position, a corresponding stop means of the second structure being adapted to maintain it in a taut state when the latter is in the proximity of the first structure, such that, on the one hand, when the first structure is rapidly spaced apart from the second structure, for example as a result of an incident during a flight, each bolt and corresponding retaining means engage with each other so as to limit the spacing between the first structure and the second structure, and, on the other hand, when the spacing is slow, for example during opening for maintenance on the ground, each bolt and corresponding retaining means remain separated, thereby allowing complete opening between the first structure and the second structure.

The term "taut state" is to be interpreted as signifying a state in which the elastic return member exerts a return force on the bolt, such a state being equivalent to either a compressed state or a stretched state of an elastic member.

Thus, when the bolt is equipped with an elastic return means which tends to bring it back into a retracted position and which is maintained in a taut state when the two structures are close to each other, the spacing of the first structure apart from the second structure causes the stop means associated with the elastic return means to move away progressively, thus causing the elastic means to return from its taut state toward a relaxed state as this spacing proceeds. Thus, the movement of the bolt under the action of the elastic return means from a set position toward its retracted position also depends on the spacing of the first structure apart from the second.

If the spacing is slow, for example in the case of opening during a maintenance operation on the ground, the stop means remains in contact with the elastic return means and limits its return toward its relaxed position. Thus the movement of the bolt toward its retracted position strictly follows the spacing apart of the two structures and has the same velocity.

If the spacing is sufficiently rapid, the elastic return means is no longer maintained in a taut state by the stop means during the spacing, and consequently the elastic return means is rapidly relaxed. However, this relaxing movement of the elastic return means is less rapid than the spacing of the first structure apart from the second structure. This is because the stop means is no longer in contact with the elastic return means, and therefore the velocity of the spacing of the structures is greater than the velocity of relaxation of the elastic return means, and consequently greater than the velocity of the return of the bolt into its retracted position.

It is therefore necessary simply to provide a sufficient space between the bolt and the corresponding return means in order to prevent the movement of the second structure with respect to the first except when this movement takes place slowly. This is because, when the second structure is rapidly spaced apart from the first structure, the retaining means, linked to the second structure, is moved rapidly enough to engage the bolt in the set position before the bolt has time to move far enough away from its position in which the retaining means is adapted to engage it, and in which it has been maintained by the elastic return means under the action of the stop means. Conversely, when the first structure is slowly spaced apart from the second, the bolt has enough time to return to its retracted position and to move away from its initial position in which it was maintained by the elastic return means and in which it could be engaged with the retaining means. In this case, the two structures can therefore be spaced apart from each other, whereas, when the second structure is rapidly spaced apart from the first, the bolt is engaged with the retaining means before it can move far enough away from its set position toward its retracted position, and the spacing of the two structures apart from each other is therefore prevented.

It should also be noted that the catching device according to the invention is automatically re-set during the closing movement when the maintenance operation has been completed. This is because, during closing, in other words when the first structure and the second structure are brought toward each other, the stop means of the second structure brings the corresponding elastic return means back into a taut state and maintains it there. Consequently the bolt is also forced to return to its set position and is maintained there until the next opening of the two structures.

It is also advantageous to take into consideration any play between the parts, and also the adjustment of the structures, by providing a space between the bolt and the corresponding retaining means which is slightly greater than the theoretical trajectory of the bolt, in order to ensure that such random factors do not interfere with the correct operation of the mechanism.

Advantageously, the bolt is mounted so as to be rotatable about an axis.

In a first variant embodiment of the invention, the elastic return means is placed in opposition to a lever which is linked to the bolt and which is adapted to contact the stop means by means of a surface designed so as to pivot in an unstable way under the action of the elastic return means. Advantageously, the contact surface between the lever and the stop means has an edge. Also advantageously, the edge is rounded.

Advantageously, the elastic return means is an axial spring. Alternatively, the elastic return means is a leaf spring.

In a second variant embodiment of the invention, the elastic return means is mounted on the axis of rotation of the bolt. Advantageously, the elastic return means is mounted on an axis of rotation of the bolt, and the spring is advantageously a spiral spring.

Preferably, the retaining means takes the form of a hook.

Preferably, the stop means is adapted to act on an elastic return means of the bolt and to maintain it in a compressed state.

The present invention also relates to a structure of an aircraft nacelle which is adapted to be spaced apart from or to be brought toward another structure, characterized in that it comprises at least one bolt placed in opposition to at least one elastic return means which tends to bring it back into its retracted position.

Preferably, this structure as described above is characterized in that it is a half-structure of a thrust reverser fitted to a turbojet engine nacelle.

Clearly, the bolt or bolts can be fitted to either the movable or the fixed structure, and the other structure, which is, respectively, fixed or movable with respect to the first structure, is then equipped with retaining means and with the corresponding one or more stop means. It should be noted that the two structures can be movable with respect to a third structure which is fixed.

The use of the invention will be made clearer by the following detailed description which refers to the attached drawing in which.

Figure 1:
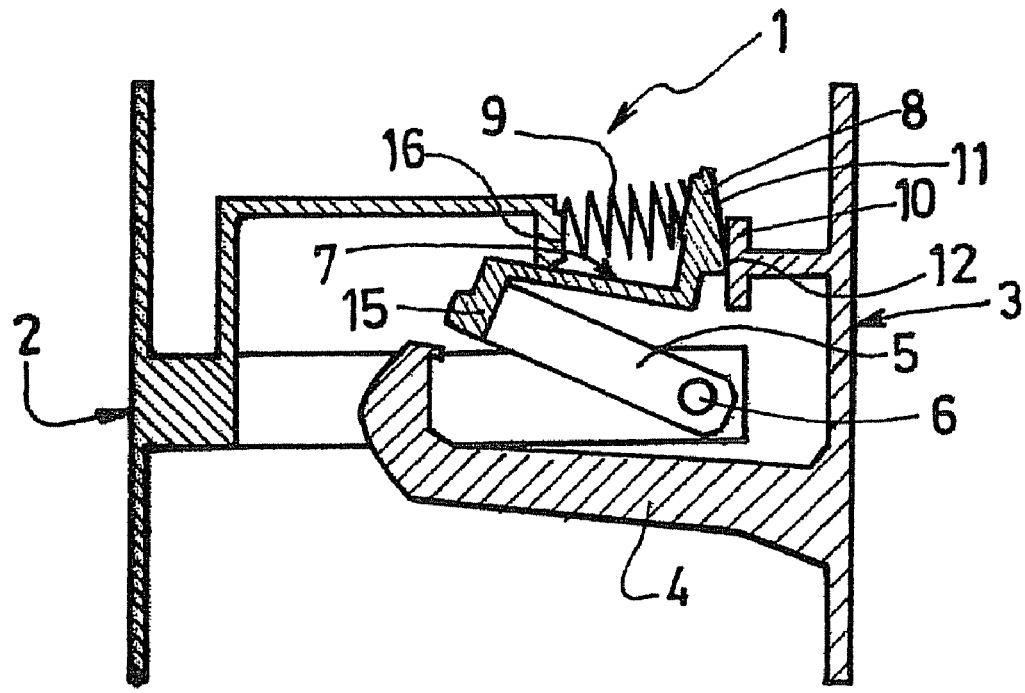
FIG. 1 is a schematic representation of a catching device according to the invention between a first structure and a second structure of an aircraft nacelle before the setting of this device.

Before proceeding to describe an embodiment of the invention, it is important to state that the invention is not limited to a specific fitted nacelle structure which may or may not be equipped with a thrust reverser. As a general rule, the present invention relates to any structure which comprises parts which can move with respect to each other, and which is to be provided with an automatic catching system to limit the relative movement of one part with respect to the other while allowing said parts to be spaced apart easily. Such a device is used, for example, on thrust reversers having two half-structures surrounding part of the turbojet engine and mounted in a radially movable way in order to enable maintenance operations to be carried out on the part of the turbojet surrounded by the reverser. Clearly, this device can be used on a nacelle which does not comprise a thrust reverser but which is equipped with movable covers allowing access to the inside of said nacelle. In such a case, these locking devices are installed at the twelve o'clock position, in other words at the top of the nacelle, and are particularly difficult to access.

A catching device 1 according to the invention, as shown in FIGS. 1 to 4, is intended to prevent the spacing of a first structure 2 apart from a second structure 3. For example, it may have the function of preventing the radial opening of a half-assembly of a thrust reverser with respect to a nacelle to which it is integrally fixed.

For this purpose, the catching device 1 comprises a hook 4 fitted to the second structure 3 and forming a retaining means adapted to interact, when appropriate, with the bolt 5 linked to the first structure 2. The bolt 5 is mounted rotatably about an axis 6 in such a way that it can move alternatively from a set position, in which the bolt 5 is adapted to be engaged with the hook 4, to a retracted position, in which the bolt 5 is moved away from the hook 4 and cannot be engaged by the latter.

The catching device 1 also comprises a lever 7 linked to one end 15 of the bolt 5. This lever 7 terminates in a heel 8 bearing on a spring 9 mounted on a surface 16 of the first structure 2, and located facing a stop 10 fitted to the second structure 3.

The heel 8 is adapted to contact the stop 10 by means of a surface 11 having a rounded edge 12 which is offset with respect to the axis of the spring 9 and which is adapted to act as a pivot under the action of the spring 9. Thus, when the spring 9 is compressed, it exerts a return force tending to make the lever 7 pivot in a direction in which the bolt 5 is opened toward its retracted position.

A user wishing to actuate the catch between the first structure 2 and the second structure 3 will proceed as follows.

Initially, the second structure 3 is separated from the first structure 2, or, as shown in FIG. 1, simply touches it lightly; in other words, the stop 10 is simply in contact with the edge 12 without exerting pressure on the heel 8, and therefore without compressing the spring 9. The catching device 1 is therefore in the retracted position, the bolt 5 being kept spaced apart from the hook 4 by the action of the spring 9 on the lever 7.

Figure 2:
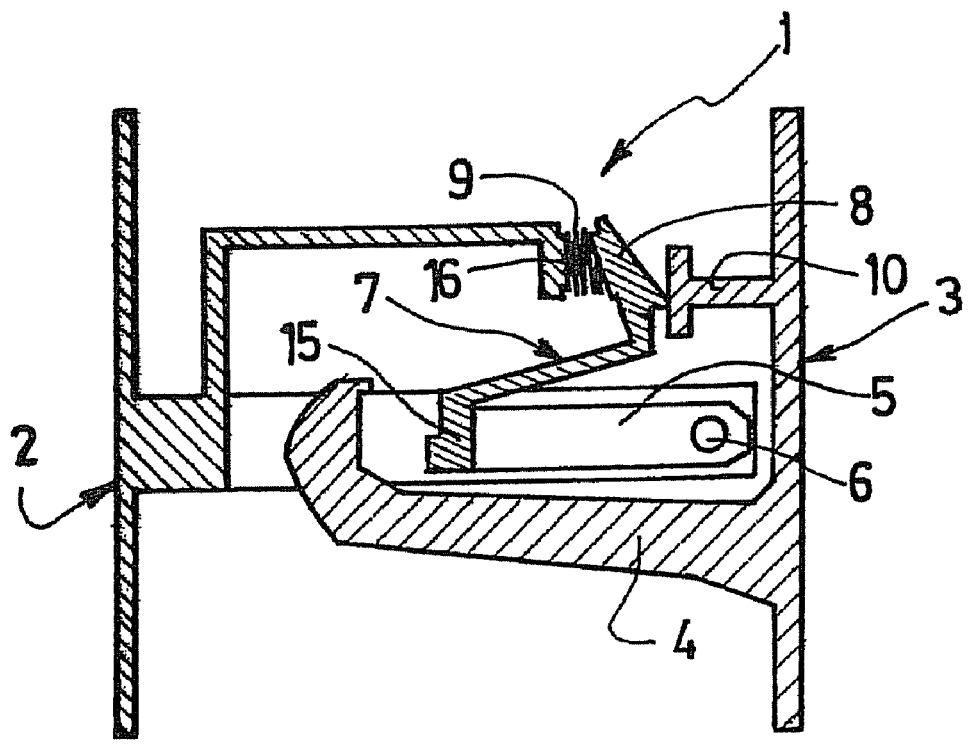
FIG. 2 is a representation of the device of FIG. 1 after the setting of the device.
Figure 3:
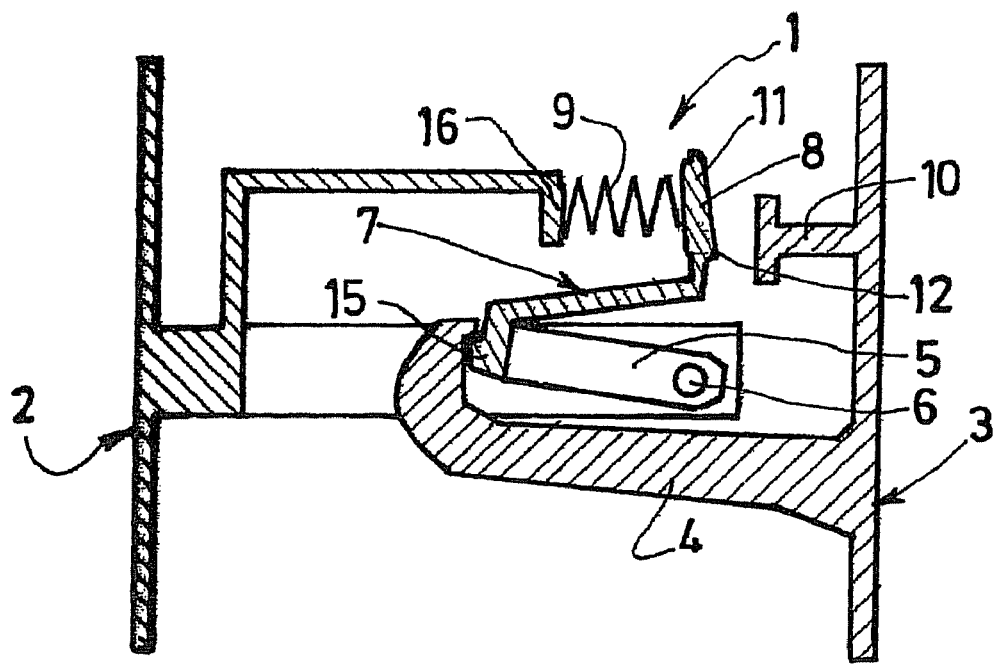
FIG. 3 is a representation of the device of FIG. 1 in a locking position after the two structures have been spaced apart rapidly.
Figure 4:
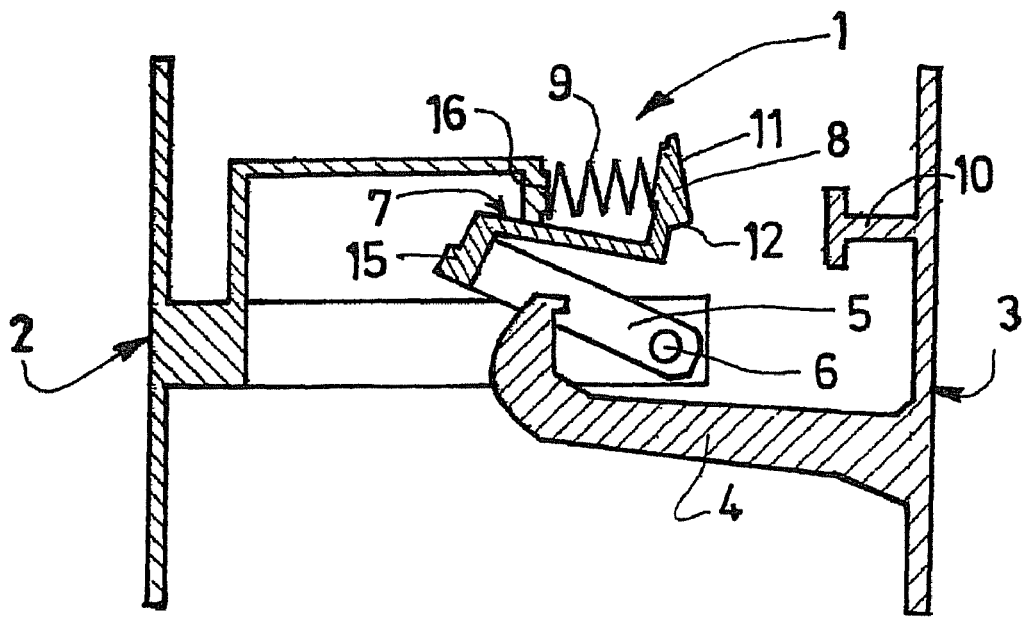
FIG. 4 is a representation of the device of FIG. 1 in a retracted position after the two structures have been spaced apart slowly.

In order to link the first structure 2 and the second structure 3 to each other, the catching device 1 must be set as shown in FIG. 2. For this purpose, the second structure 3 is brought toward the first structure 2. The stop 10 then exerts a pressure on the heel 8 and consequently compresses the spring 9. Simultaneously, the retraction of the heel 8 causes the bolt 5 to pivot toward a closing position in which it faces the hook 4.

It is now necessary to distinguish between the cases in which the second structure 3 is spaced rapidly or slowly apart from the first structure 2.

If the second structure 3 is spaced apart rapidly from the first structure 2, such spacing being caused, for example, by an incident during flight such as the bursting of an air pipe of the turbojet engine, the velocity of spacing is greater than the velocity of relaxation of the spring 9, and the stop 10 is rapidly disengaged from the heel 8, while the hook 4 moves rapidly toward the bolt 5. Since the stop 10 is no longer in contact with the edge 12, the latter no longer acts as a pivot point facilitating the rotation of the lever 7 and the bolt 5. Consequently, a slower rotary movement is imparted to the bolt 5 under the action of the decompression of the spring 9, and the trajectory of the end 15 with respect to the hook 4 is relatively flattened, depending on the velocity at which the second structure 3 is spaced apart from the first structure 2. Thus the hook 4 engages the bolt 5 before the latter has had time to pivot sufficiently to be spaced apart from the hook 4. Consequently, the spacing of the second structure 3 apart from the first structure 2 is halted.

If the second structure 3 is spaced apart from the first structure 2 slowly, for example at the time of opening to carry out a maintenance operation on the ground, the stop 10 moves slowly enough to be followed by the heel 8, which is pushed back against said stop 10 by the spring 9. The stop 10 therefore remains in contact with the edge 12, which, due to the force exerted by the spring 9 against the heel 8, acts as a pivot point which assists the rotation of the lever 7 and therefore of the bolt 5. Consequently, the trajectory of the end 15 of the bolt 5 follows a practically circular trajectory while the hook 4 moves toward the bolt 5. Thus, when the hook 4 comes near enough to the bolt 5 to be capable of engaging it, the bolt has already pivoted enough to be spaced apart from the hook 4, in a retracted position. Since the hook 4 is not engaged with the bolt 5, the movement of the second structure 3 with respect to the first structure 2 is not halted, and can be continued until the desired opening is achieved.

Thus, in an application to a nacelle protecting a turbojet and comprising hatches and/or a reverser having two radially movable half parts, these elements can be linked together to the nacelle using catching devices 1 according to the invention. Thus these elements can be opened slowly or manually during maintenance operations on the ground, without the need for an operator to unlock all the locking devices which close these movable elements during flight. Conversely, if an incident occurs during a flight, such as the rupture of an air pipe of the turbojet, which would tend to cause these movable elements to be spaced apart rapidly, the catching devices 1 according to the invention ensure the retention of these movable elements.

Clearly, although the invention has been described with reference to specific examples of embodiment, it is not restricted in any way by this, and comprises all the technical equivalents of the means described and their combinations where these fall within the scope of the invention.

The invention claimed is:

1. A catching device between a first structure and a second structure which can move with respect to each other, comprising a bolt which is pivotally mounted to the first structure, said bolt being adapted to be engaged, when appropriate, with a retaining means provided on the second structure, wherein said bolt includes a lever end, an elastic return means mounted between the first structure and the lever end tending to bring the bolt back to a retracted position; and a corresponding stop means on the second structure being adapted to contact the lever end and maintain the catching device in a taut state when the second structure is in the proximity of the first structure, said taut state being determined such that, when the first structure is rapidly spaced apart from the second structure causing a rapid release of the stop mean, said bolt, returning toward its retracted position under the action of the elastic return mean, and said retaining means engage with each other, thus limiting the relative spacing between the first structure and the second structure, and, on the other hand, when the spacing is slow, causing a gradual and relatively slow release of the stop mean, said bolt, returning in the same way toward its retracted position, and said retaining means remain separated, thereby allowing complete opening between the first structure and the second structure.

2. The catching device as claimed in claim 1, wherein said lever end has a surface designed so that said bolt is pivotable in an unstable way under action of the elastic return means.

3. The catching device as claimed in claim 1, wherein a contact surface between the lever and the stop means has an edge.

4. The catching device as claimed in claim 3, wherein the edge is rounded.

5. The catching device as claimed in claim 1, wherein the elastic return means is an axial spring.

6. The catching device as claimed in claim 1, wherein the elastic return means is a leaf spring.

7. The catching device as claimed in claim 1, wherein the elastic return means is a spiral spring.

8. The catching device as claimed in claim 1, wherein the retaining means takes the form of a hook.

9. The catching device as claimed in claim 1, wherein the stop means is adapted to act on an elastic return means of the bolt and to maintain the elastic return means in a compressed state.

* * * * *